Oct. 12, 1965  C. B. KEYES ETAL  3,211,274
MULTI-TIERED CONVEYOR SYSTEM
Original Filed Sept. 11, 1961  4 Sheets-Sheet 1
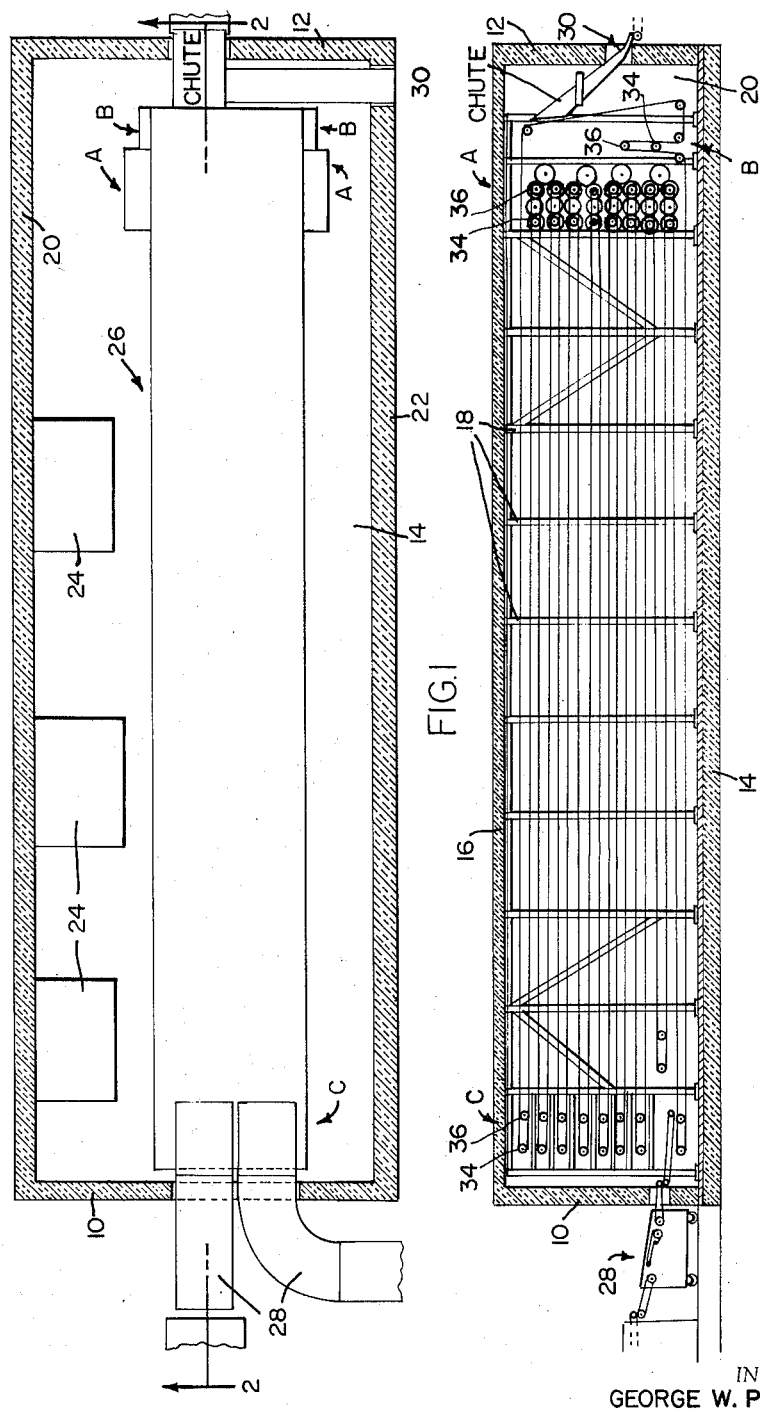
INVENTORS
GEORGE W. PEARCE
CLIFFORD B. KEYES
BY
Edgar O. Rost
ATTORNEY

INVENTORS
GEORGE W. PEARCE
BY CLIFFORD B. KEYES

ATTORNEY

INVENTORS
GEORGE W. PEARCE
CLIFFORD B. KEYES

ATTORNEY

Oct. 12, 1965     C. B. KEYES ETAL     3,211,274

MULTI-TIERED CONVEYOR SYSTEM

Original Filed Sept. 11, 1961     4 Sheets-Sheet 4

INVENTORS
GEORGE W. PEARCE
CLIFFORD B. KEYES
BY

*Edgar D. Rost*

ATTORNEY 3,211,274
MULTI-TIERED CONVEYOR SYSTEM
Clifford B. Keyes, 43 Pine Ridge Road, Arlington, Mass.,
and George W. Pearce, 98 Collins St., Danvers, Mass.
Continuation of application Ser. No. 137,338, Sept. 11,
1961. This application Sept. 21, 1964, Ser. No. 400,623
2 Claims. (Cl. 198—84)

This is a continuation of our copending application Ser. No. 137,338, dated Sept. 11, 1961 now abandoned.

The present invention relates generally to conveyor systems utilized in the food processing industry wherein large quantities of a product may be handled and, in particular, to a new and improved system of the endless chain type which provides a plurality of horizontal tiers.

Conveyor systems of the type to be described hereinafter are commonly employed for the processing of edible food products over a predetermined period of time with a minimum of space being required for all overall operation. Numerous prior art systems capable of transporting a plurality of trays now exist, however, the problem of stabilizing the trays, as well as, maintaining the food-carrying surface in a horizontal position as they pass from one level to another is paramount.

An industry which as advanced substantially in recent years involves the processing of fish products in relatively large low temperature chambers over extended periods of time. Present systems have been plagued by further problems relating to timing of driving mechanisms, particularly where a plurality of traverses are necessary and the lower and upper runs are far removed. In addition, the sub zero temperatures create problems in accurate alignment of the means which facilitate travel from one tier to the next. Frequent stoppages due to binding of the mechanism are common occurances with resultant loss of time, expense and imperfections or damage to the processed product.

It is, therefore, a primary object of the present invention to provide a new and improved conveyor system of the endless chain type which avoids the disadvantages of prior art systems.

A further object of the invention is to provide a new and improved conveyor system for use in a sub zero environment.

A still further object of the invention is to provide a conveyor system having a plurality of trays traveling in a series of continuous horizontal traverses wherein the food-carrying surfaces will be positioned in a horizontal manner during the entire processing cycle.

Another object of the invention is to provide a conveyor system having a plurality of tiers wherein the drive means are oriented in close proximity to each tier.

These and other objects which will become apparent as the description of the invention unfolds are attained in the manner described in the following brief summary of the principal features of the invention.

The subject conveyor system provides for the control and support of a plurality of food-carrying members or trays by means of a plurality of chains with the trays pivotally secured to the chains on all four corners. A novel return mechanism is provided for returning the trays to a proper loading position after a plurality of horizontal tiers have been traversed. The support means are joined to parallel disposed chains on each side of the trays and the trays may pass from one level to another without the use of arcuate guide elements. In addition the food products may be conveniently directed to and unloaded from the main conveyor system by adjacent conveyors, the loading one of which may be intermittently operated to avoid spillage of the product.

The illustrative embodiment of the invention will be described in detail with reference to the freezing of fish products at temperatures in the sub zero region. It will be realized of course that the invention will be equally applicable to other industries for the processing of other products requiring horizontal stabilization and positioning at all times during baking, drying or other operations.

Other objects, features and advantages will be evident after consideration of the following detailed description and reference to the accompanying drawings, wherein:

FIG. 1 is a plan view of an illustrative embodiment of a complete conveyor system;

FIG. 2 is a sectional view along the line 2—2 in FIG. 1;

Figure 3:
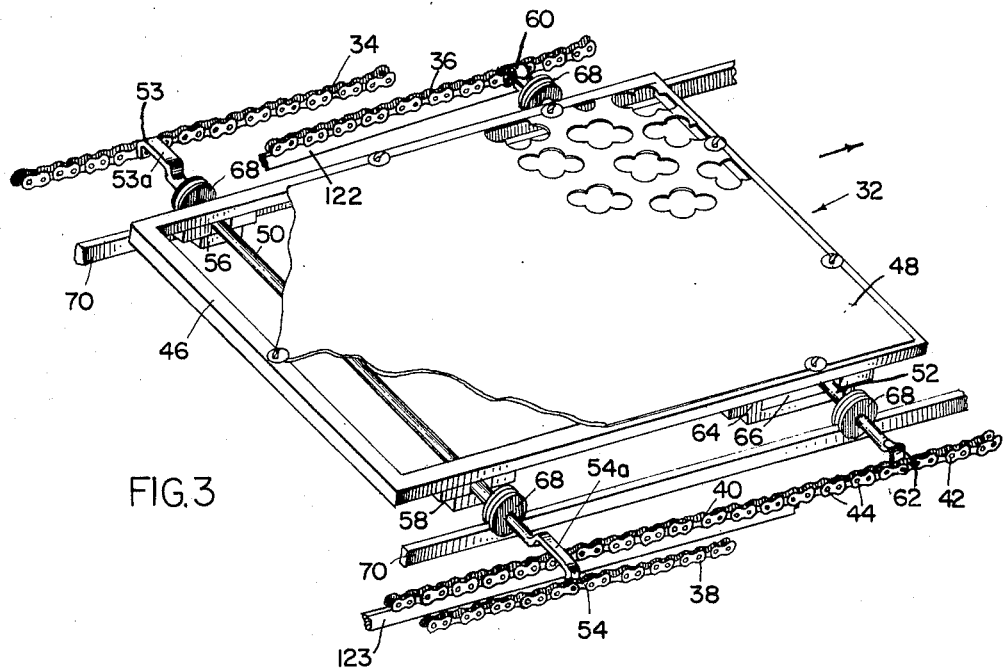
FIG. 3 is an enlarged perspective view illustrative of the mounting of the carrying members.

Referring to the drawings, FIGS. 1 and 2 illustrate an overall conveyor system of substantial length completely enclosed by means of insulating end walls 10 and 12 with a base 14 and top wall 16. Intermediate supporting beams 18 may be provided in accordance with structural requirements. Side walls 20 and 22 complete the enclosure with a plurality of refrigerating units 24 contained therein to provide the required environmental condition for the processing of the food product. The conveyor system with a plurality of tiers illustrative of the teachings of this invention is designated generally by numeal 26 and is associated with auxiliary intermittent feeding conveyors 28 for loading and discharge conveyors 30 for unloading of the finished product.

The specific structure pertinent to the invention will now be described, reference being had to FIGS. 3 to 7 inclusive.

A plurality of trays 32 of a generally rectangular shape, are secured to endless chains 34, 36, 38 and 40 of the standard roller-type having a plurality of links 42 interconnected by pins 44. Each tray comprises a frame 46 having secured to the upper portion thereof a perforated platform 48 on which the food products are carried. For the purposes of this description, chains 34 and 38 will be referred to as the outside chains, and chains 36 and 40 will be referred to as the inside chains.

The means for supporting and stabilizing trays 32 comprise rotatable axle members 50 and 52 extending transversely to the direction of travel of the conveyor system. Axle member 50 is secured to chains 34 and 38 by means of couplers 53 and 54 pivotally secured at the ends thereof with said couplers adapted to provide clearance for the inside chains by means of U-shaped portion 53a and 54a. The couplers 53 and 54 may be secured to the respective chains by means of removal of the pins 44 and the insertion of a stud and welding to the link 42. Retainers 56 and 58 secured to the under carriage of frame 46 provide for the retension of axle member 50 in its desired position. In a similar manner axle member 52 is secured to inside chains 36 and 40 by means of couplers 60 and 62. Bracket members 64 secured to the under carriage of frame 46 are adapted to retain the axle member in its position, however, these members are provided with a slot or key way 66 to provide for pivotal and longitudinal movement of this axle member during certain portions of the overall conveyor run as will be evident hereinafter. Rollers 68 are provided adjacent to the ends of the respective axle members and are adapted to engage guide rails 70 provided for additional support on the longer horizontal traverses of the trays. As a result of the aforementioned means, the trays 32 are secured on all four corners and are adapted for movement with all four chains throughout the entire run. The trays will thus be stabilized to prevent tilting.

Figure 5:
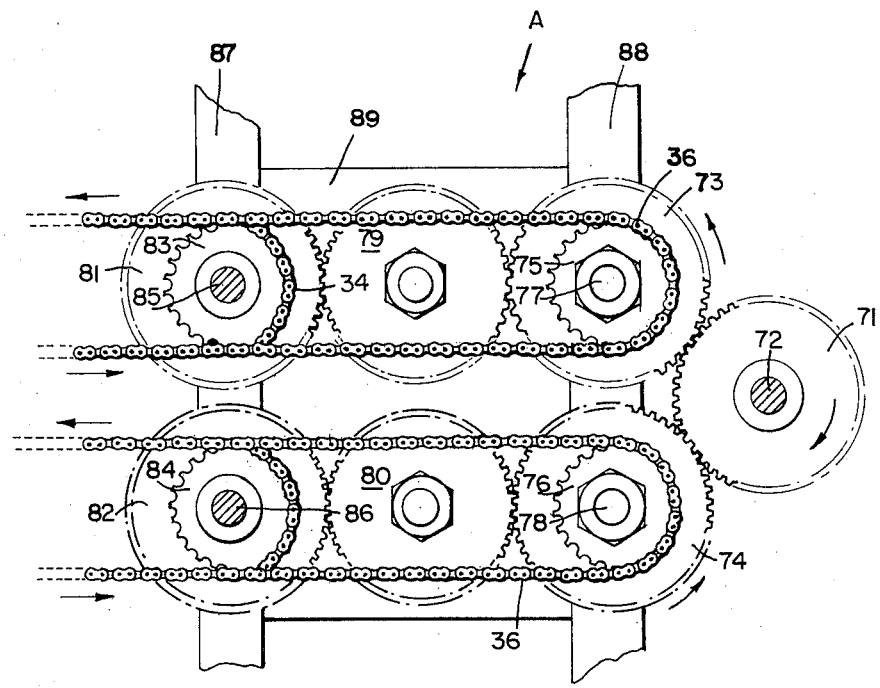
FIG. 5 is a side elevation view of the driving means of the illustrative embodiment.

The drive means for the chains will now be described and are indicated generally by letter A in FIGS. 1 and 2 and are shown specifically in FIG. 5. One such drive mechanism will be described, however, it may be noted that of a plurality of such mechanisms will be provided in accordance with the member of horizontal traverses desired. In addition since the gearing arrangements are the same on both sides only one such arrangement need be described in detail.

Drive gear 71 is secured to connecting shaft 72 which has a similar gear disposed at its other end. Motor drive means (not shown) will be coupled to the outside of the drive gear by means of a sprocket and chain arrangement common in the art or any other suitable means. Rotation of shaft 72 will result in a clockwise rotation of gear 71.

Meshing gears 73 and 74 which are rotatably mounted will be controlled by rotation of drive gear 71. For the purposes of this invention the inside chains 36 and 40 will be trained around sprockets 75 and 76 secured to gears 73 and 74. Short shafts 77 and 78 with a terminal nut are provided for mounting of these gear-sprocket members. An intermediate or idler gears 79 and 80 provides for simultaneous rotation of another series of meshing gears 81 and 82 carrying sprockets 83 and 84 mounted by means of short shafts 85 and 86. This arrangement will be utilized for the movement of the outside chains, with one of these, namely 34, being shown. Since the chains all will run on a parallel plane it will be necessary for the sprockets controlling the inside chains to be offset a sufficient distance from the facing of the gears to provide the proper clearance. It may be noted that the overall drive means may be supported by means of vertically disposed frame members 87 and 88 as well as horizontal braces 89. It is important to note that the spacing between the shafts is approximately equal to the spacing between the axle members 50 and 52 in order that the couplers carried by the outside chains will pivot around the forward sporckets at the same time that the couplers carried by the inside chains clear the rearwardly disposed sprockets.

Figure 6:
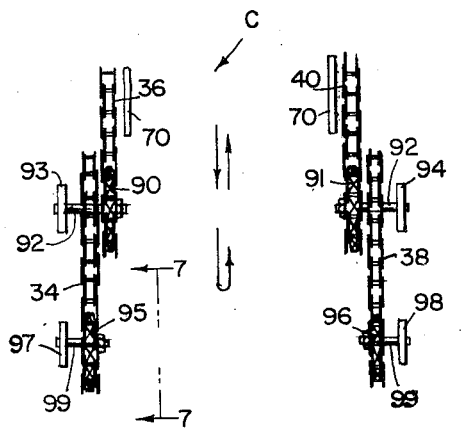
FIG. 6 is a plan view of the sprocket means disposed at the ends of each of the horizontal traverses.
Figure 7:
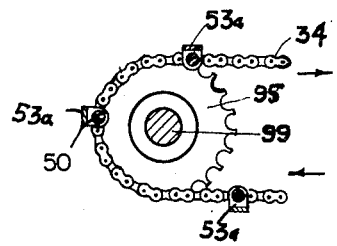
FIG. 7 is a fragmentary sectional view along the line 7—7 in FIG. 6.

Attention will now be directed to the opposing end of each of the horizontal traverses to explain the structure there disposed and indicated generally by the letter C and shown in detail in FIGS. 6 and 7. Since all four chains are disposed in a parallel plane, the sprockets around which these chains are trained will be in an offset tandem relationship. Sprockets 90 and 91 mounted on short shafts 92 carried by suitable support members 93 and 94 provide for movement of the inside chains 36 and 40. Sprockets 95 and 96 carried by suitable support means 97 and 98 are mounted on shafts 99 to provide for the training thereon of the outside chains 34 and 38. It may be noted that the spacing between the shafts is again approximately equal to the distance between the axle members of the trays. The manner in which the trays 32 traverse this portion of the conveyor run will now be described by referring to FIG. 7. Since the couplers are adapted to pivot, their position will be altered at each level of the horizontal runs.

Coupler 53 joined to chain 34, is shown approaching sprocket 95. In this position the U-shaped portion 53a is disposed downwardly. As the chain moves the coupler to the next position approximately 90 degrees therefrom, the arm which is controlled by the chain has started to pivot so that it is now in a vertical position. The final phase of this circular run is now shown in the last view in the upper portion with the upper surface of the coupler 53a now being rotated 180 degrees, without however tilting while raising the tray from one level to another. In this manner the tray may be continuously moved along a horizontal plane each time progressing to a higher level until the upper level of the overall conveyor system is attained where the products will be in position for unloading. In the overall system disclosed in FIGS. 1 and 2 it will be thus possible to provide for seventeen complete horizontal traverses actuated simply by four drive mechanisms disposed at the other end. The direct control of the chain members by a plurality of drive means provides for accurate timing of the overall run.

In the operation of the conveyor system the food products to be processed will be loaded onto the trays by means of intermittently operated conveyors 28 with said products proceeding to successively higher levels during each horizontal run until the uppermost run is attained. At this upper portion of the conveyor run the trays will be moved around a simple sprocket arrangement to provide a right angle path. In traversing this path the trays will tilt approximately 45 degrees to thereby discharge the contents, which are now in a solidly frozen state, onto a discharge chute and conveyor arrangement 30 to the outside of the overall freezing enclosure for further handling. After discharge of the food products, the trays will now be traveling in a vertically disposed position to the lower level where the unique return mechanism now to be described, as indicated by the letter B, will position the trays to the proper manner for loading again to begin another cycle.

Figure 4:
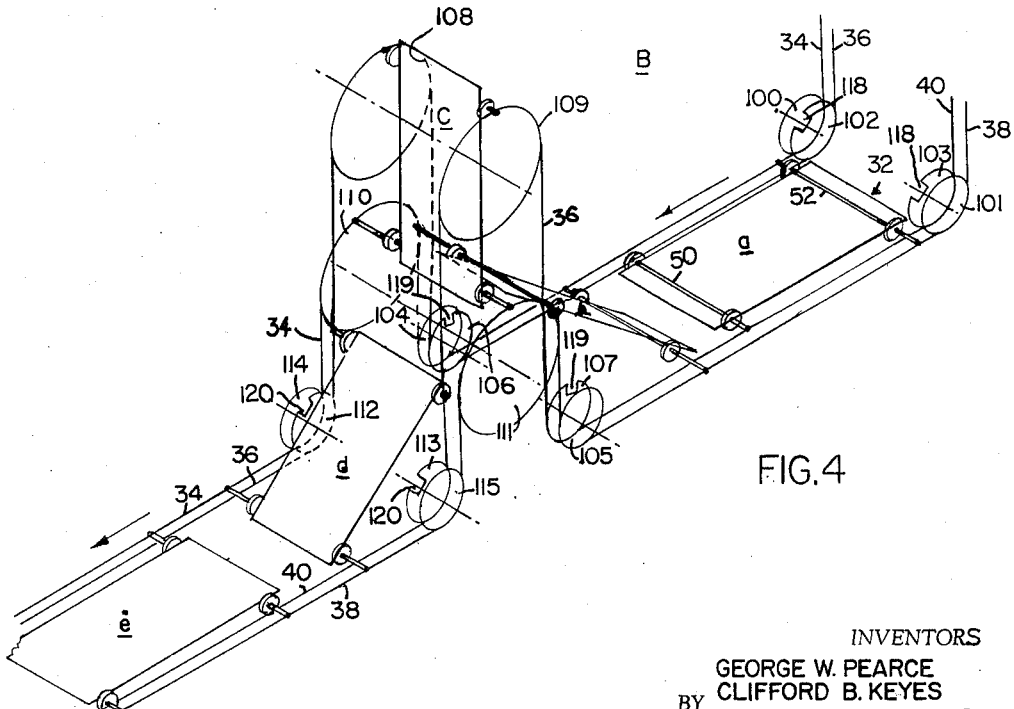
FIG. 4 is a diagrammatic representation of the sprocket and chain mechanism for the return of the carrying members to the proper position for the loading operation.

The mechanism for the return of the conveyor trays may best be described by the diagrammatic representation shown in FIG. 4. After the trays have completed the vertical descent a plurality of sprockets are provided to move same around a right angle path. Sprockets 100 and 101 are adapted to engage chains 34 and 38 while sprockets 102 and 103 engage 36 and 40. During this portion of the conveyor run the trays are now disposed with the platform 48 in a downward position. After a short horizontal run another group of paired sprockets are disposed, namely 104 and 105 for the outside chains and 106 and 107 for the inside chains. The chains are now looped over vertically disposed sprockets having a larger diameter than the aforementioned sprockets to provide short vertical runs in opposite directions. The outside chains will be trained over sprockets 110 and 111. In a like manner the inside chains will be trained over sprockets 108 and 109. While larger sprockets have been shown, the same result may be accomplished by two sprockets spaced apart.

After traversing the vertical runs the chains will now be trained around another set of sprockets with the inside chains engaging sprockets 112 and 113 and the outside chains engaging sprockets 114 and 115 to provide for right angular movement. The chains will now continue in a horizontal path until the loading station is attained at the extreme left of the enclosure as shown in FIG. 2.

The manner in which the trays will be returned to the proper position will now be explained with the direction of travel being indicated by the arrows in FIG. 4. Upon completion of the vertical run the trays 32 will be in an upside down position as indicated by $a$. In the position indicated by $b$ the tray has commenced an upward vertical movement until the position $c$ is attained with the tray disposed in a vertical manner. As the tray is moved over the larger size sprockets it commences its descent with the top platform disposed in the proper manner as shown in position $d$. The trays may now continue for the remainder of the conveyor run with the food-carrying surface properly positioned as indicated by $e$.

To accommodate the coupler arms 53a and 54a which span the inside chains, the sprockets carrying these chains will be provided with a notch. Hence, sprockets 102 and 103 are provided with notches 118, sprockets 106 and 107 with notches 119 and sprockets 112 and 113 are provided with notches 120.

While an illustrative method of attachment has been described which necessitates the provision of notches on the inside chain bearing sprockets, it will be possible to reverse the attaching means, as well as the slidable axle member, to thereby eliminate these notches. The primary feature of the invention resides in the support of the tray members on all four corners for positive stabilization through the provision of four endless chains simultaneously controlling their movement.

It may be noted that in certain prior art embodiments arcuate guide elements are provided at the ends of each horizontal traverse in a system employing only two endless chains. Such elements may be entirely eliminated. The staggered arrangement of the sprocket members at each end of the traverses may be determined by the distance between the axle supports for the trays. In addition each horizontal tier is now driven by means disposed adjacent one end thereof. The positive drive gear means are interconnected by a through drive shaft which assures accurate timing of the chain movement at all times in contradistinction to prior art systems wherein the overall drive mechanism must be positioned at the lower level and all upper tiers are distantly controlled therefrom. The positive timing of the present invention becomes important at sub zero temperatures where icing of the chains or sprocket members may readily occur.

Figure 8:
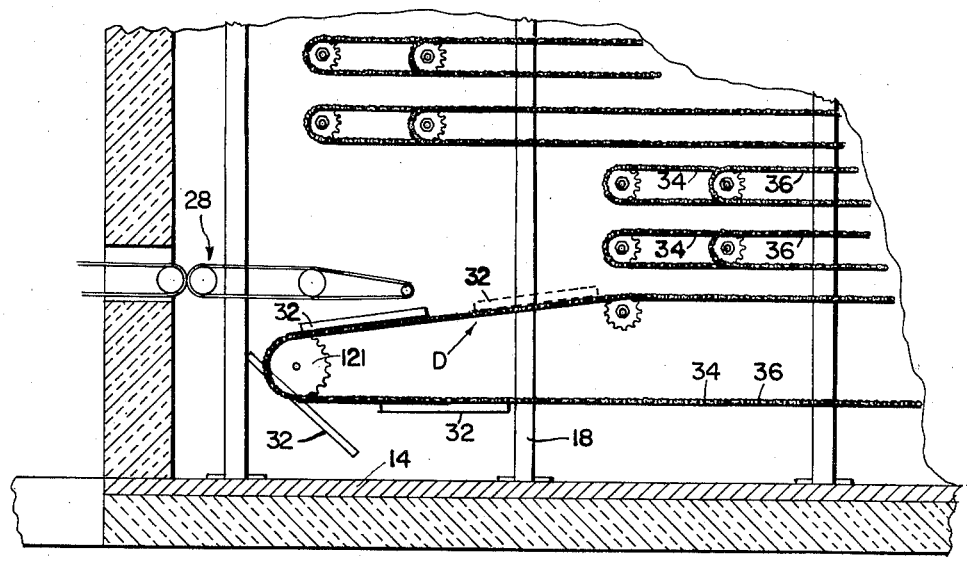
FIG. 8 is a fragmentary sectional view of an alternative return mechanism.

In the embodiment shown a vertically disposed return mechanism is provided with the same offset tandem relationship for all four chains. Such an arrangement is particularly advantageous where maximum space utilization is desired in that additional tiers may now be positioned in the lower section of the freezing chamber. In certain applications however, an alternative return mechanism may be desirable and an illustrative embodiment of this is shown in FIG. 8.

Similar components have been similarly numbered and the tandem relationship of the chains 34 and 36 is similarly maintained. In this embodiment, the trays traversing the vertical run from the uppermost level will be traveling with the loading surface disposed downward toward the base 14. All four chains will be trained over somewhat larger sized sprockets 121. The diameter of these sprockets will be determined by the minimum distance between axle members 50 and 52 when the latter has moved within keyways 66. The spacing to be provided in this lower portion of the overall conveyor system must be sufficient to provide for clearance of the rear portion of the trays as the couplers are carried around the circumference of the sprockets. It may be noted that as the forward portion of the tray circumvents the sprockets, the rear axle member 52 will move within the keyways 66. A horizontally sloping run D will then be traversed with the food products being loaded onto the trays by conveyor 28. In lieu of the larger sized sprockets, similar results may be attained by two of the smaller sized sprockets for each chain.

Referring agains to FIG. 2, the theory of the operation of the invention will now be explained. The tandem relationship of the sprockets and chains at each level will be similar and this position of the system will be referred to as the main circuit while the uppermost level, vertical run at the end and the lower level will be referred to as the auxiliary circuit. Each interlevel transfer, therefore, has the outside chain 34 extending beyond the inner chain 36 at the left hand section of the main circuit. The opposite or right hand section reverses this relationship and we now have the inner chain 36 extending beyond the outer chain 34. It may be noted that there are nine tandem transfers on the left and only eight on the right, or an asymmetrical distribution. Hence, to have all chains of the same length and to provide the means of positioning the trays properly after each complete cycle, it is necessary to provide one additional tandem transfer in the system. This transfer may be positioned at any intermediate point in the auxiliary circuit in any desired manner, such as vertical, horizontal, or slanting. The auxiliary transfer indicated as B, therefore, provides the equalization factor and the chains 34 and 36 are maintained in the same relationship as the transfers at the right hand portion of the view shown in FIG. 2. If the asymmetrical distribution resulted in fewer of the left hand transfers then the additional intermediate tandem transfer would have a chain and sprocket relationship similar to this end of the system.

The provision of the equalizing transfer mechanism at an intermediate point in the auxiliary circuit makes room for additional horizontal traverses adjacent to the base of the chamber. Where, however, space is not critical, a symmetrical distribuition of transfers may be provided at the ends of the main circuit and the returning mechanism will be provided as shown in FIG. 8. With this distribution the return mechanism would be disposed at a terminal end of the auxiliary circuit.

Since the coupler arms connected to the outside chains must span and provide clearance for the inside chains, it may be noted that the spanning arm alternates its positioning as the trays over the main circuit in the serpentine manner. As the trays travel from right to left in FIG. 2 the spanning coupler arm would be disposed underneath the inside chain. Upon transfer to the next level this coupler arm will now be disposed above the inside chain in traveling from left to right. This same alternation of the coupler arm continues from one level to the next.

Within the scope of this invention the system may be constructed with inside chains 36 extending beyond outside chains 34 in the left hand portion of FIG. 2. If this alternate construction is selected the alternating disposition of the spanning coupler arms will also be reversed. Further, the choice between the alternate constructions may be determined on the basis of reducing the number of sprockets in the auxiliary circuit requiring notches to accommodate the spanning coupler arm.

In view of the long traverses in certain applications, chain sagging may be a factor in overall timing of the conveyor run. In such applications, supporting track members 122 and 123, as shown in FIG. 3, will carry the chains. With the spanning coupler arms 53a and 54a disposed beneath the inside chains, the track members would support the outside chains and the inside chains are also supported by the spanning coupler arms. At the next level with the coupler arms riding above the inside chains, the track members would now support the inside chains. By alternately supporting the chains at each level, the foreshortening effect of sagging will tend to be self-equalizing.

There is thus disclosed a unique conveyor system having a plurality of parallel endless chain members on opposite sides which provide for support of trays on all four corners by pivotal means adjacent to each corner. The inner and outer chains are trained over sprocket arrays in an offset tandem relationship for each inter-level transfer so that the front and rear portion of the trays simultaneously traverse the sprockets. The distance between the axes of the sprockets is approximately equal to the distance between the axle members interconnecting the tray and chain connecting means. A multi-level system may be provided with a plurality of horizontal traverses in the main circuit disposed in a successive recurrent serpentine manner. Interconnected drive means adjacent to the tandem transfer sprocket arrays at one end of each level of the system provides for accurate timing thereof.

Alternate systems having either a symmetrical distribution of tanden transfers at the ends or an asymmetrical distribution may be selected depending on space available for the overall system. Where the asymmetrical distribution is selected, an equalizing tandem transfer will be positioned at an intermediate point in the auxiliary circuit of the system to properly return the trays to the starting point of the cycle. In the symmetrical distribution the trays will be positioned by an array of sprockets having a common axis at a terminal end of the auxiliary circuit. The attaching means carrying the trays are alternately positioned at each level and the food carrying surfaces of the trays are maintained horizontally throughout the entire main circuit of the system.

While reference has been made to the processing required in the freezing of fish products, the travel of the conveyor may be completely reversed or altered for other products and other processes without in any way altering the tenor of the invention. It is intended that all matter specifically described herein be interpreted in accordance with the spirit and scope of the invention as defined in the appended claims.

We claim:

1. A multi-tiered conveyor system comprising a plurality of parallel paired coplanar inside and outside endless chain members oppositely disposed and spaced apart to define therebetween a conveyor run, said conveyor run having a plurality of horizontal traverses disposed in a recurrent serpentine manner to define the main circuit of the system; rotatable sprocket members disposed in tandem offset relationship at the ends of each horizontal traverse at each level in contact with said chain members, aligned meshing gear members communicating with at least one of said sprocket members at an end of each traverse; interconnected drive means coacting with said gear members; a plurality of spaced rigid carrier members having upper and lower planar surfaces; means connecting one end of each of said carrier members to the inside chain members and means connecting the other end of said carrier members to the outside chain members; an auxiliary circuit interconnecting the upper and lower traverses and including a vertical run; an additional array of tandem offset sprocket members disposed adjacent to the bottom of said vertical run and coacting with each of said chain members; said sprocket members being vertically disposed to define two short vertical runs traveling in opposite directions to reverse the disposition of the ends of the carrier members during traversal of the auxiliary circuit.

2. A conveyor system according to claim 1 wherein the distance betwen axes of said additional array sprocket members is approximately equal to the distance between the carrier and chain members connection means.

References Cited by the Examiner
UNITED STATES PATENTS 1,321,520 11/19 Greer _____ 198—137
2,310,055 2/43 Bausman _____ 198—159

SAMUEL F. COLEMAN, *Primary Examiner.*